United States Patent Office 2,734,084
Patented Feb. 7, 1956

2,734,084

SYNTHESIS OF 1-HALO-2,3-BUTANEDIONE-3-OXIMES

Mona Phyllis Doerner, Walnut Creek, Calif., assignor to The Dow Chemical Company, Midland, Mich., a corporation of Delaware No Drawing. Application July 21, 1953,
Serial No. 369,528

5 Claims. (Cl. 260—566)

This invention relates to the synthesis of 1-halo-2,3-butanedione-3-oximes and is particularly directed to a method for the preparation of compounds of the structural formula

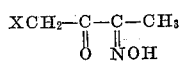

wherein X represents chlorine or bromine.

The 1-halo-2,3-butanedione-3-oximes are of value as intermediates in the preparation of more complex organic derivatives. Also, they have fungicidal and bactericidal properties and are useful as constituents of fungicidal compositions. This utility is illustrated by the activities observed for compositions of the bromo and chloro 2,3-butanedione-3-oximes where concentrations of 200 parts by weight per million give 100 per cent control of the organism *Rhizoctonia sp.*

It has now been discovered that the 1-halo-2,3-butanedione-3-oximes may be produced in very high yield by the reaction of nitrogenoxychloride or nitrogenoxy-bromide with chloro- or bromomethyl ethyl ketone. The ketone reactant has the structural formula

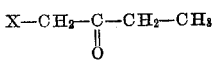

wherein the symbol X is chlorine or bromine. In this operation, the nitrogenoxyhalide in gaseous form is passed into or otherwise contacted with the liquid halo-ketone at a reaction temperature to accomplish the formation of the desired monoxime compound in yields of from 85 to 95 per cent of theoretical. The monoxime compounds are solid crystalline materials which precipitate out of solution during the progress of the reaction, and may be separated from the crude reaction product in any of a number of ways. By-product hydrogen halide is evolved during the reaction and may be recovered in conventional absorption apparatus. By-products of reaction generally occurring in the proportion of from about 3 to 15 per cent by weight of the crude monoxime product are the compounds of the formula

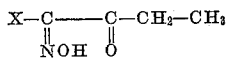

wherein the symbol X is chlorine or bromine. These by-products are generically termed "hydroxamyl halides" in the present specification.

The temperature of reaction in the present process preferably is maintained at below about 25° C. The reaction is somewhat exothermic and cooling is employed as well as careful control of the rate of introduction of the nitrogenoxyhalide to prevent overheating. Also, agitation of the reaction mixture is desirable to avoid local overheating as well as occlusion of reactants in the monoxime product as precipitated. Good results and high yields of the desired product are obtained when the temperature is maintained below 20° C. and preferably at 10° to 18° C.

The theoretical reaction requires equal molar proportions of nitrogenoxyhalide and halo-ketone. In practice, a molar excess of the halo-ketone conveniently may be employed, such excess serving as solvent of reaction and aiding in the complete utilization of the nitrogenoxyhalide. If desired, the halo-ketone may be dispersed in a small amount of an inert organic solvent such as chloroform or carbon tetrachloride and the nitrogenoxyhalide introduced into the dispersion. The contacting of the nitrogenoxyhalide with the halo-ketone may be accomplished in any convenient manner. Thus, the nitrogenoxyhalide may be introduced beneath the surface of the halo-ketone or solution of the latter, with any suitable sparger or inlet tube, care being taken to avoid the possibility of clogging or closure of the outlet of such means by reason of the deposition of solid monoxime product in and about the orifice. The rate of introduction should be carefully controlled so as to avoid overheating of the reaction mixture or the loss of nitrogenoxyhalide by incomplete reaction with the halo-ketone. Various modifications of apparatus may permit the operation of the reaction as a continuous process. Such operation would require intermittent or continuous introduction of both the nitrogenoxyhalide and halo-ketone, with portions of the reaction mixture being removed, the solid monoxime product separated, and unreacted halo-ketone returned to the reaction zone.

The time required to accomplish the reaction is essentially a function of the rapidity with which the nitrogenoxyhalide efficiently may be contacted with the halo-ketone (1) without causing overheating of the reaction mixture, or (2) being incompletely reacted. Reaction rates and times of reaction may vary considerably depending upon details of apparatus and other operating conditions.

When the reaction is completed, 1-halo-2,3-butanedione-3-oxime product may be separated by filtration, decantation or otherwise from liquid components of the crude reaction mixture. Filtration or wheeling followed by washing with cold water and drying, accomplishes a substantial separation of precipitated product from unreacted halo-ketone and by-product hydroxamyl halide. The liquid components of the crude reaction mixture frequently may be concentrated by heating under reduced pressure or otherwise to recover a second crop of precipitated monoxime. Recovered halo-ketone subsequently may be returned to the reaction zone of a continuous or semi-continuous process, or reacted with additional nitrogenoxy-halide in the case of a batch operation. Similarly any solvent of reaction may be recovered by fractional distillation of the liquid components of the crude reaction mixture.

The monoximes as obtained from the separation, washing and drying steps may be further purified if desired, by recrystallization from organic solvent, treatment with activated carbon, or other conventional purification procedure.

The following examples illustrate the invention but are not to be construed as limiting.

Example 1

1.0 mole of nitrogenoxychloride is slowly passed into a small molecular excess of chloromethyl ethyl ketone with agitation at 20–25° C. until reaction is initiated as evidenced by the decolorization of the nitrogenoxychloride. The temperature of the reaction vessel and contents is then reduced by external cooling to 10°–17° C. and held within this range for the balance of the period of addition of the nitrogenoxychloride. As the reaction progresses, hydrogen chloride is evolved and a solid product of reaction is precipitated. This product is recovered from the crude reaction mixture by filtration and the solid residue washed thoroughly with ice water and thereafter dried to obtain a 1-chloro-2,3-butanedione-3-oxime product in the form of white crystals and in a yield of 85 to 95 per cent of theory. This product is of value as a fungicidal toxicant without further modification. Upon recrystallizing from a mixture of 1 part by volume of benzene with 2 parts of hexane and decolorization with activated bone-charcoal, the substantially pure compound is obtained melting at 116–117° C.

As by-product from the reaction there may be recovered from the liquid phase of the crude reaction mixture from 5 to 15 per cent of theory of alpha-keto-butyrohydroxamyl chloride.

Example 2

1.0 mole of bromomethyl ethyl ketone is dispersed in one-third of its volume of carbontetrachloride and 1.0 mole of nitrogenoxychloride slowly passed into the resulting solution through a submerged sparger tube serving also as an agitator. The reaction mixture and vessel are subjected to external cooling to maintain the temperature at 12°–15° C. during the addition of the nitrogenoxychloride. Hydrogen chloride is led out of the reaction zone as formed and absorbed in a water trap. The desired monoxime product precipitates from the reaction mixture. When addition of nitrogenoxychloride is complete, the crude reaction mixture is filtered to recover 1-bromo-2,3-butanedione-3-oxime as a white crystalline product in substantially theoretical yield. Upon washing with cold water, recrystallization and drying this compound had a melting point of 86.0–87.5° C.

Example 3

By substituting nitrogenoxybromide for the nitrogenoxychloride of Examples 1 and 2, similar results are obtained with the difference that hydrogenbromide is recovered as a by-product of reaction.

I claim:

1. A method for the preparation of 1-halo-2,3-butanedione-3-oximes of the formula

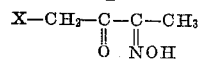

wherein X is one of the halogens chlorine and bromine, which comprises the steps of (1) reacting a compound of the group consisting of nitrogenoxychloride and nitrogenoxybromide with at least an equi-molar amount of a halo-ketone of the formula

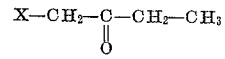

wherein X is one of the halogens chlorine and bromine, and (2) separating the desired 1-halo-2,3-butanedione-3-oxime product of reaction from the hydroxamyl halide by-product.

2. The method of claim 1 wherein the reaction is carried out at a temperature below 20° C.

3. The method of claim 1 wherein the nitrogenoxyhalide in gaseous form is passed into a molar excess of the halo-ketone reactant at a temperature below 20° C.

4. A method for the preparation of 1-chloro-2,3-butanedione-3-oxime which comprises the steps of (1) reacting nitrogenoxychloride with at least an equi-molar amount of chloromethyl ethyl ketone, and (2) separating solid 1-chloro-2,3-butanedione-3-oxime of reaction from by-product alpha-ketobutyrohydroxamyl chloride.

5. A method for the preparation of 1-chloro-2,3-butanedione-3-oxime which comprises the steps of (1) passing gaseous nitrogenoxychloride into chloromethyl ethyl ketone at a temperature below 20° C., and (2) thereafter separating solid 1-chloro-2,3-butanedione-3-oxime of reaction from by-product alpha-ketobutyrohydroxamyl chloride.

References Cited in the file of this patent

Ellis: Chem. of Petroleum Derivatives, vol. 2, p. 1101 (1937), Reinhold Pub. Co., New York, N. Y.
Diels et al.: Ber. Deut. Chem. 43, 1957–62 (1910).
Allen et al.: J. Org. Chem. 6, 596–601 (1941).
Mohler: Protor 7, 78–85 (1941).